(12) United States Patent
Tamian

(10) Patent No.: US 7,069,686 B1
(45) Date of Patent: Jul. 4, 2006

(54) ADJUSTABLE SPRING ACTIVATED FISHING TACKLE DEVICE

(75) Inventor: Richard Tamian, 69 Edison Ter., Sparta, NJ (US) 07871

(73) Assignee: Richard Tamian, Sparta, NJ (US)

(*) Notice: Subject to any disclaimer, the term of this patent is extended or adjusted under 35 U.S.C. 154(b) by 0 days.

(21) Appl. No.: 11/020,298

(22) Filed: Dec. 23, 2004

(51) Int. Cl.
*A01K 91/00* (2006.01)

(52) U.S. Cl. .................................................. 43/42.72

(58) Field of Classification Search ............... 43/42.72, 43/18.1, 42.02, 15; 403/166, 43, 45, 46; 267/70, 71, 174, 175, 177; 188/166
See application file for complete search history.

(56) References Cited

U.S. PATENT DOCUMENTS

| | | | | |
|---|---|---|---|---|
| 220,926 A | * | 10/1879 | Luallen et al. ................. | 267/70 |
| 2,731,758 A | * | 1/1956 | Coe ........................... | 43/42.72 |
| 3,169,757 A | * | 2/1965 | Roder et al. .................. | 267/177 |
| 3,256,594 A | * | 6/1966 | Howard et al. ................ | 29/227 |
| 4,372,545 A | * | 2/1983 | Federspiel ................... | 267/221 |
| 4,681,303 A | * | 7/1987 | Grassano ..................... | 267/113 |
| 5,257,680 A | * | 11/1993 | Corcoran et al. ............ | 188/129 |
| 5,608,985 A | * | 3/1997 | Kainec ........................ | 43/43.1 |

* cited by examiner

*Primary Examiner*—Teri Pham Luu
*Assistant Examiner*—Joshua Michener

(57) ABSTRACT

The adjustable spring activated fishing tackle device of the invention is a simple but effective device used inline with any fishing rod and lure that aids in the capture of fish. The device is comprised of a cylindrical shaped casing with an interior chamber which houses an adjustable, triple action, spring mechanism that automatically maintains a constant counter force on the fishing line against the tugs and pulls caused by the erratic movements of a caught fish, whereby not only helping to hook the fish but also preventing any slack in the fishing line that could cause the loss of said fish.

11 Claims, 2 Drawing Sheets

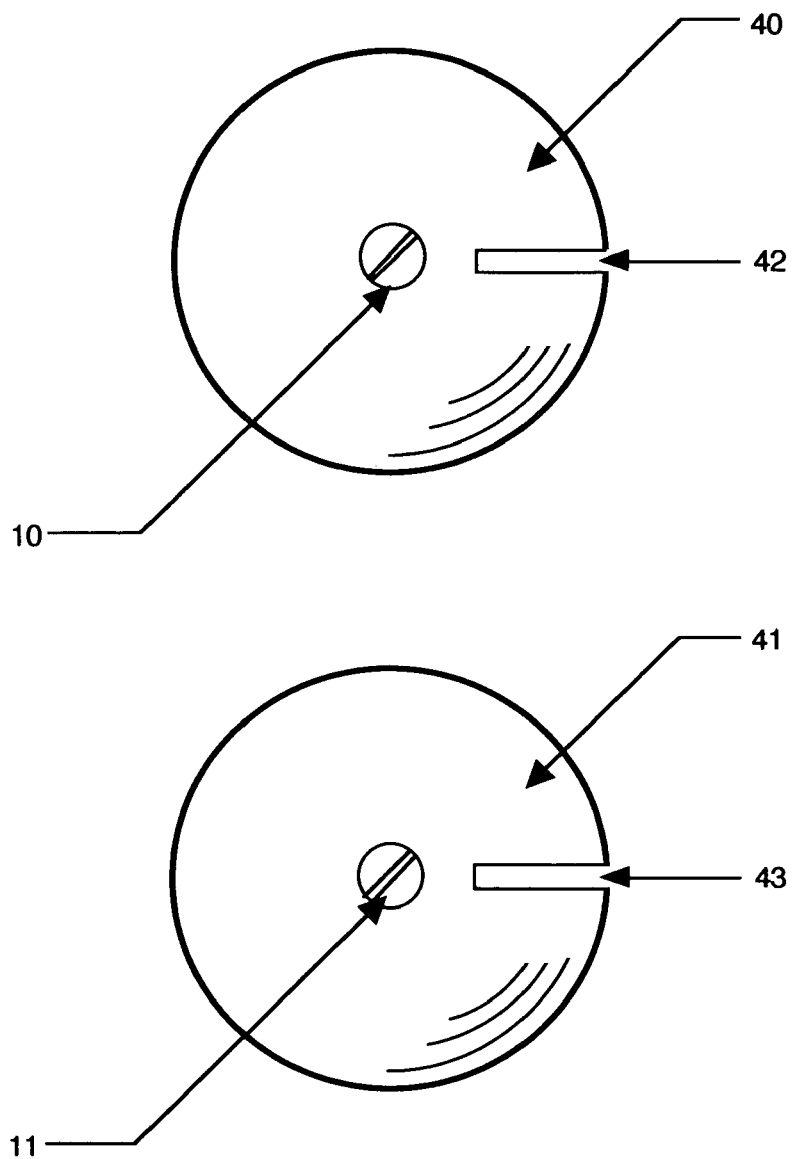

ADJUSTABLE SPRING ACTIVATED FISHING TACKLE DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISC APPENDIX

Not Applicable

BACKGROUND OF INVENTION

The present invention relates generally to an adjustable spring activated inline fishing tackle device that aids in the capture of fish when used in conjunction with a fishing rod and lure. Catching a fish requires not only proper technique but also having the proper equipment, such as with my adjustable inline triple action spring assisted fishing tackle device. Previously designed fishing tackle devices, such as U.S. Pat. No. 4,774,784 issued to Lee (1988), U.S. Pat. No. 4,616,439 issued to Lee (1986), U.S. Pat. No. 4,104,820 to Bardebes (1978), U.S. Pat. No. 3,986,289 issued to Zimmerman et al. (1976), U.S. Pat. No. 3,975,856 issued to Gadbois (1976), U.S. Pat. No. 3,803,748 issued to Neal (1974) and others address only the operations for fishing hooks. Fishing tackle flotation devices, such as U.S. Pat. No. 6,612,066 issued to James (2003), U.S. Pat. No. 6,192,620 issued to Eckenroth (2001), U.S. Pat. No. 5,970,649 issued to Alain et al. (1999), U.S. Pat. No. 5,608,985 issued to Kainec (1997), U.S. Pat. No. 5,329,722 issued to Wilson (1994), U.S. Pat. No. 4,763,437 issued to Cuda (1988) and others address the mechanics and functions for flotation level devices. Still other devices such as U.S. Pat. No. 6,467,214 issued to DeFrisco (2002), U.S. Pat. No. 5,499,472 issued to Krenn (1996), U.S. Pat. No. 5,490,348 issued to Serba (1996), U.S. Pat. No. 5,129,177 issued to Haigh et al. (1992) and others support different fishing tackle functions and operations. None of these and other fishing tackle inventions use an adjustable spring mechanism that produces an automatic constant counter force which solves and eliminates the problem of slack forming in the fishing line caused by the erratic motion of a captured fish, wherein said slack is the major cause for the loss of a hooked fish.

BRIEF SUMMARY OF THE INVENTION

The adjustable inline spring activated fishing tackle device of the invention is a simple but effective device used in conjunction with a fishing rod and lure to aid in the capture of fish. The device is comprised of a cylindrical shaped casing with an interior chamber which houses an adjustable triple action spring mechanism that automatically supplies the proper, resistive force on the tugs and pulls produced by a hooked fish, whereby keeping the fishing line taut and preventing any slack that may cause the loss of said fish. This is accomplished with my unique triple action adjustable spring mechanism, wherein two-thirds of said spring is in compression while one-third is in tension. By varying the spring's three sectional lengths of compression and tension, an appropriate counter force, within the spring's range, can be selected to match the opposing forces produced by a particular fish. To increase the counter force range for larger fish, a spring device with a greater spring stiffness value would be selected, as will be described below. Conversely, smaller fish would require a lesser spring stiffness value. Also by connecting together in parallel two or more unit devices, an even wider range of counter forces can be obtained. The adjustable inline spring activated fishing tackle device is novel in its design and in its function. Another benefit of my invention is that it can be used with almost all types of fishing rods, reels, lines, flotation devices and lures. Other advantages and essential details of the invention will become apparent from the subsequent description of preferred embodiments, the drawings, and the claims.

BRIEF DESCRIPTION OF THE DRAWINGS

FIG. 2 is a simplified top view of the washer disks 40 and 41, according to the invention illustrating their partially split sections 42 and 43 respectively. Connected to the center of washer disk 40 is shaft 10 and connected to the center of disk 41 is shaft 11.

DETAILED DESCRIPTION OF THE INVENTION

Figure 1:
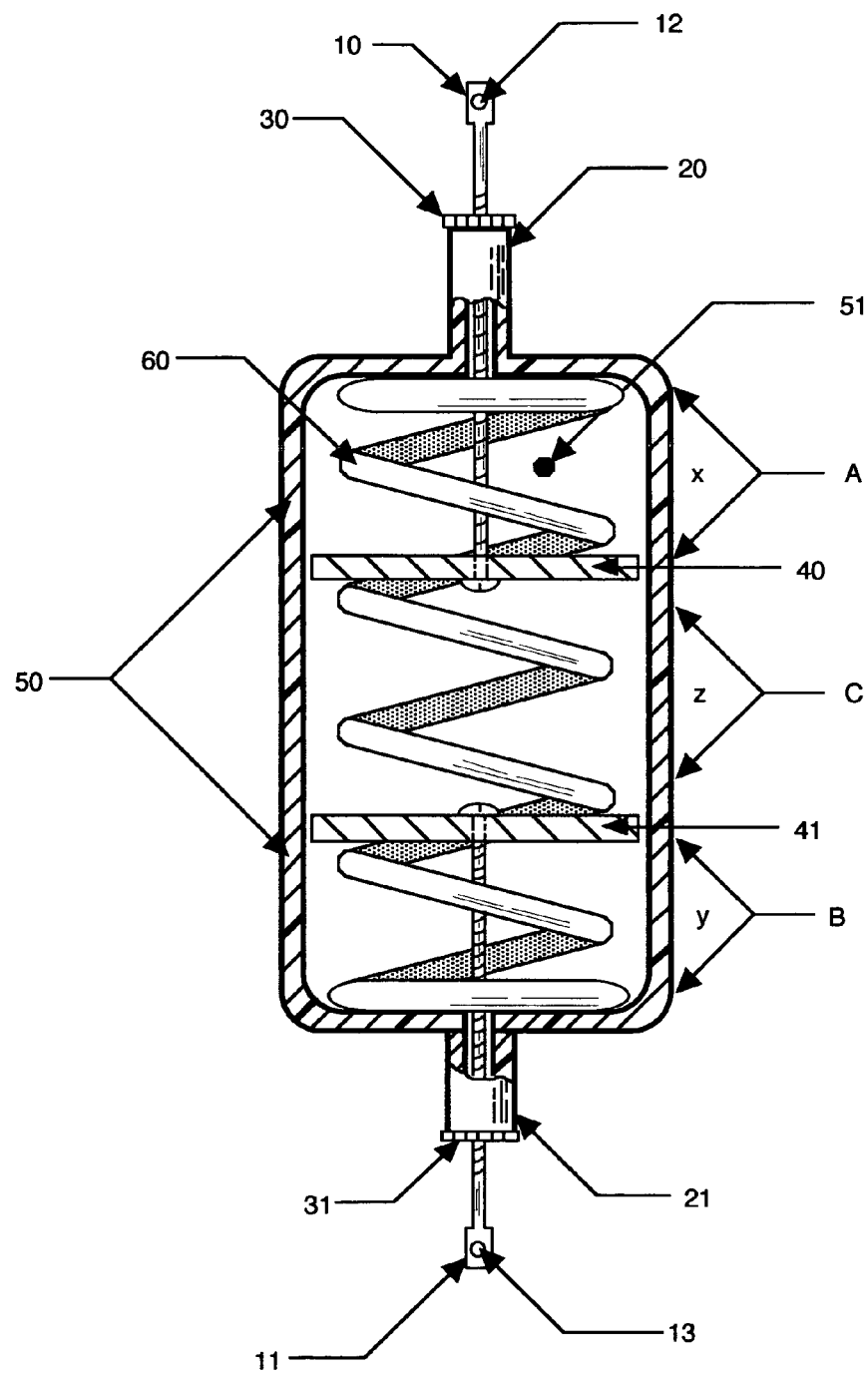
FIG. 1 is a simplified view of an adjustable spring activated fishing tackle device according to the invention, shown in partial section, illustrating a cylindrical casing 50 which houses the triple action spring mechanism which is composed of a compressional spring 60, wherein two partially split washer disks 40 and 41 are positioned within said spring's coils with shafts 10 and 11 respectively, extending from the center of each disk and out though each port opening 20 and 21. Hole 12 at the end of shaft 10 connects said device to the fishing line, while the lure is connected to hole 13 on shaft 11. By turning the shafts clockwise and counterclockwise, adjustments are made in the positions of the washer disks within the coils of the spring, producing three selected sectional counter forces. The adjusted position of these components of the spring mechanism is maintained by lug nuts 30 and 31.

Referring particularly to FIG. 1, the adjustable spring activated fishing tackle device according to the illustrated embodiment comprises a cylindrical shaped casing 50 with an opening port 20 at one end of the device and another opening port 21 at the other end, with an interior chamber 51 which houses a spring mechanism that is composed of a compressional spring 60 that extends the length of said chamber, having a circular diameter less than the chamber's interior cross-sectional diameter. Each of two identical partially split washer disks 40 and 41, as also shown in FIG. 2, has a radial diameter greater than the spring's outer diameter and less than the chamber's interior diameter. Each washer disk is placed within the spring's coils by means of their slits 42 and 43, such that said disk's radial axis runs perpendicular to the chamber's major longitudinal axis, and positioned initially about one-third the distance from an end of the spring respectively, partitioning said spring 60 into three sections of A, B, and C. Secured to the center of disk 40 is a threaded shaft 10 that extends longitudinally through the chamber and protrudes out of the port opening 20. Similarly, threaded shaft 11 is attached to disk 41 and extends longitudinally out though port opening 21. Shaft 10 has a hole 12 in its outer flanged end for attaching the fishing line, while shaft 11 has hole 13 for attaching the fishing lure and other fishing tackle accessories. A retaining lug nut is threaded onto each shaft's outer end and sits on the rim of each port opening, as will be described below.

The spring mechanism of the device is composed of a spring that is selected for its range of counter forces appropriate for the size and type of fish being sought. The spring's counter force ($F_c$) is based on two factors, which are: the spring's stiffness value (k) which is determined by said spring's composition and size, and the sectional lengths the spring is displaced by the washer disks. The spring mechanism of said device automatically responds when a fish tugs and pulls on the hook and line causing said shafts 10 and 11 to pull their respective washer disks 40 and 41 outward, causing spring sections A and B to be compressed against the chamber's ends by the lengths of x and y respectively, and causing the length z, between the disks, to stretch in section C. The total change in length of compression and tension of said spring is equal to x+y+z. Therefore, the resulting counter force ($F_c$) of said device unit can be calculated by the following Hooke's Law equation: $F_c = k \cdot (x+y+z)$. Each spring 60 has a range of counter forces, depending on its (k) value, from which individual counter forces can be selected by adjusting the positions of the washer disks 40 and 41 within the coils of said spring. By twisting said shafts 10 and 11 clockwise, their attached disks 40 and 41 screw along the spring's coils, whereby shortening the sections A and B which reduce the spring's displacement distances of x and y for compression and also lessen the distance z for tension, thereby resulting in an overall shorter displaced distance which calculates to a smaller counter force ($F_c$) generated by the spring mechanism. Conversely, by rotating said shafts 10 and 11 counterclockwise a larger counter force ($F_c$) is developed from an overall longer displaced distance. Since shafts 10 and 11 can be rotated independently from one another, a very precise counter force can be selected within the spring's range. Once the spring mechanism is adjusted for a particular ($F_c$) value, it is secured in place by the lug nuts 30 and 31 which are threaded into positioned on the shafts 10 and 11 above the port openings 20 and 21 respectively.

Another option for the fisherman is to connect two or more different spring devices together in parallel which would offer an even wider range of counter forces. The selection of the proper device(s) that would yield the necessary counter force required for a particular fish is determined by experience and experimentation.

I claim:

1. An adjustable spring activated fishing tackle device comprised of an outer casing with an open port at each end of said device, wherein an interior chamber houses a compression spring having coils that extend longitudinally through said interior chamber, wherein two partially split washer disks are positioned within said spring's coils, dividing said spring into three sections of (A), (B), and (C), whereby a threaded shaft extends from each of said disk's center through the longitudinal center of said coils and out through the open port at each end of said chamber, whereby a retaining lug nut threaded onto each end of said shafts lies on an outer rim of each open port.

2. An adjustable spring activated fishing tackle device as described in claim 1, wherein the compression spring has a spring stiffness value determined by its size and composition.

3. An adjustable spring activated fishing tackle device as described in claim 1, wherein each partially split disk is placed within said spring's coils one-third of the way from each respective end of said device, whereby each said disk's radial axis is positioned perpendicular to the chamber's longitudinal axis.

4. An adjustable spring activated fishing tackle device as described in claim 3, wherein the position of said disks within the spring's coils determines displacement distance that each respective section of (A), (B), and (C), of the spring are allowed to move.

5. An adjustable spring activated fishing tackle device as described in claim 4, wherein a threaded shaft is attached at the center of each disk and runs longitudinally through the center of the spring and protrudes out through the outer rim of each open port, forming a movable assembly, at each end of the device.

6. An adjustable spring activated fishing tackle device as described in claim 5, wherein each threaded shaft has a hole in its outer end for attaching fishing line and tackle.

7. An adjustable spring activated fishing tackle device as described in claim 6, wherein the shaft and disk assembly can be rotated independently both clockwise and counterclockwise within the spring coils, whereby adjusting the displacement distance that each spring section of (A), (B), and (C), are allowed to move.

8. An adjustable spring activated fishing tackle device as described in claim 7, wherein sections (A) and (B) of said spring are compressed as the center section (C) is stretched, when an outward pulling force is exerted on said shaft ends.

9. An adjustable spring activated fishing tackle device as described in claim 8, wherein for each displacement distance of compression of said Springs's sections (A) and (B) and the displacement distance of the expansion of section (C), there is a respective counter force produced.

10. An adjustable spring activated fishing tackle device as described in claim 9, whereby adding said three sectional forces together, yields a total counter force that neutralizes the force produced by a hooked fish.

11. An adjustable spring activated fishing tackle device as described in claim 7, wherein a threaded lug nut is located on each end of said shafts such that they secure the adjusted position of each shaft and disk assemblies.

* * * * *